United States Patent [19]

Burton

[11] Patent Number: 4,571,839
[45] Date of Patent: Feb. 25, 1986

[54] BORE GAUGES

[75] Inventor: Barrie C. Burton, Rugby, United Kingdom

[73] Assignee: System E Controls Limited, Leamington Spa, England

[21] Appl. No.: 609,529

[22] Filed: May 14, 1984

Related U.S. Application Data

[63] Continuation of Ser. No. 466,963, Feb. 16, 1983, abandoned.

[30] Foreign Application Priority Data

Feb. 16, 1982 [GB] United Kingdom ................ 8204467

[51] Int. Cl.⁴ .......................... G01B 5/12; G01B 7/12; G01B 3/26
[52] U.S. Cl. ............................... 33/178 E; 33/147 K; 33/172 E
[58] Field of Search ............. 33/147 R, 147 N, 178 E, 33/178 R, 172 E

[56] References Cited

U.S. PATENT DOCUMENTS

| | | | |
|---|---|---|---|
| 2,583,791 | 1/1952 | Neff | 33/147 N |
| 2,795,855 | 6/1957 | Worthen | 33/147 K X |
| 2,853,789 | 9/1958 | Pistoles | 33/178 R |
| 3,103,748 | 9/1963 | Emery | 33/147 K X |
| 3,808,696 | 5/1974 | Possati | 33/178 E |
| 3,882,604 | 5/1975 | Macklyn | 33/147 K |
| 4,030,202 | 6/1977 | Fadl et al. | 33/178 E |
| 4,290,204 | 9/1981 | Possati | 33/178 E |
| 4,339,879 | 7/1982 | Selleri | 33/178 E |
| 4,348,814 | 9/1982 | Possati et al. | 33/147 K X |

Primary Examiner—Harry N. Haroian
Attorney, Agent, or Firm—Scrivener Clarke Scrivener and Johnson

[57] ABSTRACT

A bore gauge incorporates one or more electromagnetic transducers housed in a shroud which in use is inserted into the bore to be gauged. Each transducer comprises a coil and a core movable within the coil. In one embodiment the coil and the core of a single transducer are mounted on opposite limbs of a flexible fork-like structure, the two limbs carrying gauging contacts for engagement with the walls of the bore. In other embodiments, incorporating a plurality of transducers, coils are rigidly mounted within the shroud and cores are mounted on flexible limbs set in slots in the surface of the shroud.

11 Claims, 8 Drawing Figures

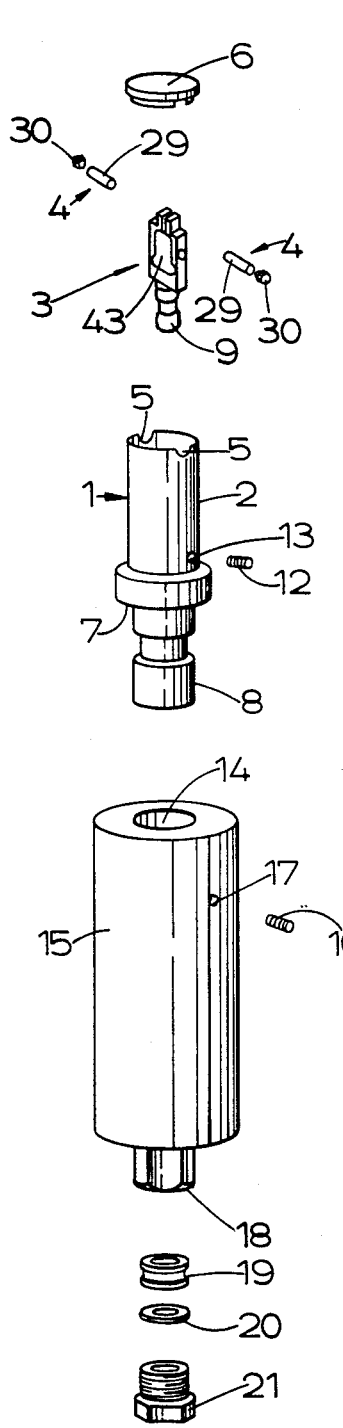
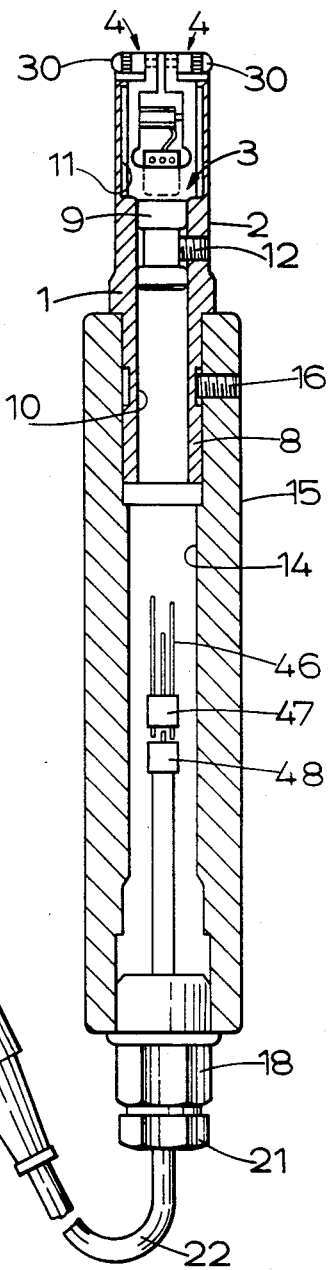
FIG.1.
FIG.2.

BORE GAUGES

This application is a continuation of application Ser. No. 466,963, filed Feb. 16, 1983, now abandoned.

SPECIFIC DESCRIPTION

This invention relates to gauges for checking bores in the field of engineering metrology and production control. It is concerned in particular with gauges of the electrical type, that is say, in which the indication is in the form of an electrical signal.

Where the bores to be gauged are of a substantial size there is no great problem in mounting commercially available electro-mechanical transducers, for example of the inductance type, radially in a plug and running wires out axially through the plug. Where the bore is smaller than will accommodate the inductance transducers available, it has hitherto been necessary to adopt some form of force-transmitting mechanism that allows the transducer to be mounted outside the bore. For example the plug carries two radially movable balls or plungers held apart by an axially sliding tapered plunger, or by a third ball engaging a plunger, and it is the axial movement of this plunger relative to the body of the plug that is detected and measured by the transducer. However, the use of even this simple and relatively direct form of mechanical transmission introduces errors. Another known form of gauge employs rocking two-armed levers to transmit the displacement to a point clear of the bore, where there is ample room for the transducer, but this introduces even more errors, including those due to deflection of the levers, and possible backlash.

A further known form of gauge employs a pair of generally parallel arms which are stepped down to a smaller operative diameter at their end portions, facilitating insertion of the end portions into the bore to be measured, the end portions carrying outwardly directed sensing tips. Mounted between the arms at a point remote from the bore where the arms are relatively widely spaced is an electrical inductance transducer comprising a multi-turn coil and a core. The coil is mounted on one arm of the pair, and the core mounted on the other for movement within the coil on relative deflection of the arms.

The principal disadvantage of this type of bore gauge is that the length of the flexible arms is fixed and hence there is no flexibility in the maximum depth of bore at which measurements can be carried out, and work in very long bores is impossible without a complete purpose built gauge with very long flexible arms. In addition such a gauge cannot be used for measurements in an inaccessible passage branching from one which is readily accessible as the length of the arms precludes the manoevering necessary to insert the gauge in the inaccessible bore. Moreover, accurate centering of the arms within their housing is required to ensure that a true diametral reading is obtained, which can be disadvantageously difficult with long flexible arms.

Air gauges are also known and have been established for many years. They can measure bores down to small diameters but suffer from drawbacks in flexibility of use, in particular from the fact that, although the signals from two points can be added, they cannot be subtracted, and so differential gauging is difficult.

It is an aim of the invention at least to partially overcome the above disadvantages and to provide a bore gauge adaptable for various applications by simple interchanging of parts and which carries out where appropriate a truly diametral measurement upon insertion of the gauge centrally in the bore. It is a further aim of the invention to provide in at least one embodiment a bore gauge capable of carrying out measurements and so generating signals from any number of points within the bore which can be subjected to any required processing and particularly to enable differential gauging.

According to the invention, there is provided a bore gauge incorporating at least one electrical inductance transducer comprising a multi-turn coil and a core mounted to move within the coil, at least one of the core and coil being movable with a gauging contact which engages a wall of the bore to be measured, the transducer being disposed at least partially within a protective shroud, the shroud being adapted to be inserted into the bore in use and the gauging contact protruding from the shroud.

In a preferred embodiment there is provided one or more pairs of gauging contacts, each contact of each pair being carried by respective limbs of a fork-like structure, the fork-like structure being made in one piece. The core may be directly attached to one limb of the fork and the coil directly attached to the other limb of the fork. Preferably, the core is mounted to move within the coil without means for guiding and locating the core within the coil other than the limbs themselves.

A further preferred embodiment includes a plurality of transducers each comprising a coil and a core, one of which of each transducer is movable with a gauging contact, and one of which of each transducer is rigidly mounted within the shroud.

The coil and the core are preferably surrounded by or embedded in a packing material sufficiently flexible to allow the required relative movement between the core and the coil yet sufficiently robust to protect the core and the coil from mechanical shock. The gauging contacts may be permanently fixed to the fork or may be detachable and comprise sensing tips made of a hard material detachably mounted on spacers of appropriate length which are adapted for attachment to the fork. When long spacers are used, the shroud may be adapted to support such long spacers over their length.

Some preferred embodiments of the invention will now be described, by way of example only, with reference to the accompanying drawings, in which:

FIG. 1 is a exploded perspective view of a first bore gauge according to the invention, with the connecting leads omitted;

FIG. 2 is a side view, partly in cross-section, of the bore gauge of FIG. 1 in an assembled condition, with the end cap omitted;

Figure 3:
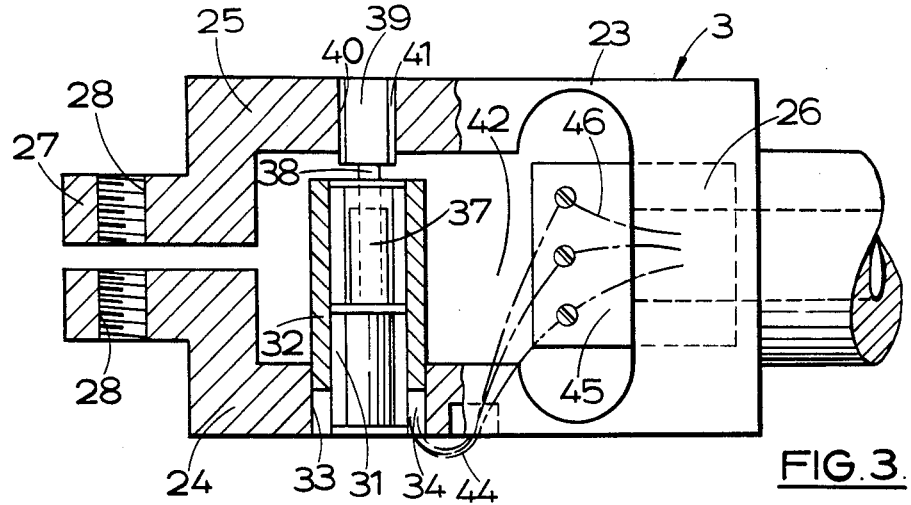
FIG. 3 is a side view, partly in cross-section, of the fork and transducer of the bore gauge of FIGS. 1 and 2.

FIGS. 1 and 2 show a bore gauge for use in measuring the diameter of or variations in the diameter of a bore, for instance in a casting. A shroud 1, turned from case-hardened steel, receives in a cylindrical outer portion 2 a transducer, shown generally at 3 in FIGS. 1 and 2 and in detail in FIG. 3, carrying two opposed gauging contacts 4 which protrude radially of the shroud 1 through apertures in the form of notches 5 in the sides of the shroud 1. An outer open end of the outer portion 2 of the shroud 1 is closed by a push-fit plastics end cap 6 (omitted in FIG. 2) provided with notches to accommodate the gauging contacts 4. The shroud 1 is turned to provide a backstop 7 (the function of which is explained below), and a radially stepped plug 8. In assembly, a rearwardly axially extending radially stepped plug 9 of the transducer 2 is inserted into a narrow portion 10 of a stepped axial bore 11 of the shroud 1, and is retained in position by an Allen type grub screw 12 which passes through a radially drilled hole 13 in the cylindrical wall of the outer portion 2 of the shroud 1. The bore 11 is accurately machined such that when the bore gauge is assembled, the gauging contacts 4 of the transducer 3 are disposed diametrically of the shroud 1, thereby ensuring that the distance being gauged by the gauging contacts 4 is the true diameter of the bore under test rather than a chord thereof, assuming the shroud 1 is correctly centred with respect to the bore. The shroud 1 is interchangeable for various applications of the bore gauge (see below).

The plug 8 of the shroud 1 fits snugly into an axial bore 14 of a cylindrical metal handle 15 and is retained in it by an Allen type grub screw 16 which passes through a radially drilled hole 17 in the handle and engages a narrow portion of the plug 8. The external surface of the handle 15 is knurled to provide a gripping surface for an operator's hand.

A first hexagonally-headed screw-threaded bush 18 closes the end of the bore 14 remote from the shroud 1 (not shown separately in FIG. 1). The bush 18 itself is provided with a screw-threaded axial bore into which are inserted a resilient plastics plug 19 and a plastics washer 20 which are retained in position by a second headed screw-threaded bush 21, the last mentioned three items all having axial bores through which is passed the external connecting lead 22, which terminates in a five-pin plug.

Turning now to FIG. 3, the transducer 3 is constituted by a one piece fork-like structure 23, formed either by machining from a single piece of spring steel plate or by investment casting. Two limbs 24, 25 embrace a hollow portion 42 and are connected by a bridge portion 26, and the limbs 24, 25 are internally cut away at their respective connections with the portion 26 to increase their flexibility. The end portions 27 of the limbs 25, 26 are inwardly stepped and are are shown in FIG. 3 to be provided with screw-threaded transverse bores 28 to accommodate screw threaded gauging contacts 4 (FIGS. 1, 2), although gauging contacts could be brazed onto the end portions 27. The gauging contacts 4 (FIGS. 1, 2) comprise cylindrical spacers 29 having externally screw-threaded stems at one end for engagement in the bores 28 of the limbs 24, 25, and being internally screw-threaded at the other end for engagement with externally screw-threaded stems of generally hemi spherical tungsten carbide sensing tips 30, which could be screwed directly into the bores 28 of the limbs 24, 25 if necessary.

The electromagnetic components of the transducer 3 are diagrammatically shown in FIG. 3 and comprise on the one hand a multi-turn coil 31, having a housing 32 which is directly attached to the limb 24 by force-fitting in a bore 33 in the limb 24 which is subsequently filled with silicone rubber shown at 34.

A ferromagnetic core 37 is mounted on a spindle 38 which extends from a plug 39 inserted in a bore 40 in the opposite limb 25 to that bearing the coil 31, the bore 40 subsequently being filled with silicone rubber shown at 41. The core 37 is mounted for movement within the coil 31 upon relative movement of the limbs 24, 25 with no guiding or locating means provided to this end other than the limbs 24, 25 themselves. In this way the transducer 3, can be made sufficiently small to be housed entirely within the shroud 1 for insertion into the bore to be measured as a complete and independent unit, the only fundamentally necessary connection to the exterior of the shroud 1 being the electrical connection of the transducer 3, discussed below. The hollow portion 42 of the fork 23, following mounting of the coil 31 and the core 37, is filled with a packing material (shown at 43 in FIG. 1) which is sufficiently flexible to allow the required relative movement of the coil 31 and the core 37 but sufficiently robust to protect the coil 31 and the core 37 from mechanical shock. In practice, the compound used is the same silicone rubber used to pack the bores 33, 40 in the limbs 24, 25 in which the coil 31 and the core 37 are mounted.

External electrical connections are made by means of fine leads shown diagrammatically at 44 in FIG. 3, which are connected to a tag board 45 mounted by adhesive on the fork 23. Connected to the tag board 45 are leads shown diagrammatically at 46 (FIG. 2 and FIG. 3) which pass along axial bore 59 of the shroud 1 into the handle 15 and terminate in a connector 47. A corresponding connector 48 terminates the external connecting lead 22 so that a dismountable connection is made within the handle 15. The handle may also accommodate any on-board electronic equipment necessary in some applications.

In use, gauging contacts 4 of appropriate length are fitted to the transducer and the shroud 1 inserted into the bore to be measured, the limit of travel into the bore being defined by the backstop 7. The inherent resilience of the fork 23 causes the gauging contacts 4 to be urged against the walls of the bore, any change in the diameter of the bore resulting in relative movement of the limbs 24, 25 of the fork 23 and a consequent electrical signal generated by the coil 31 and the core 37.

Figure 4:
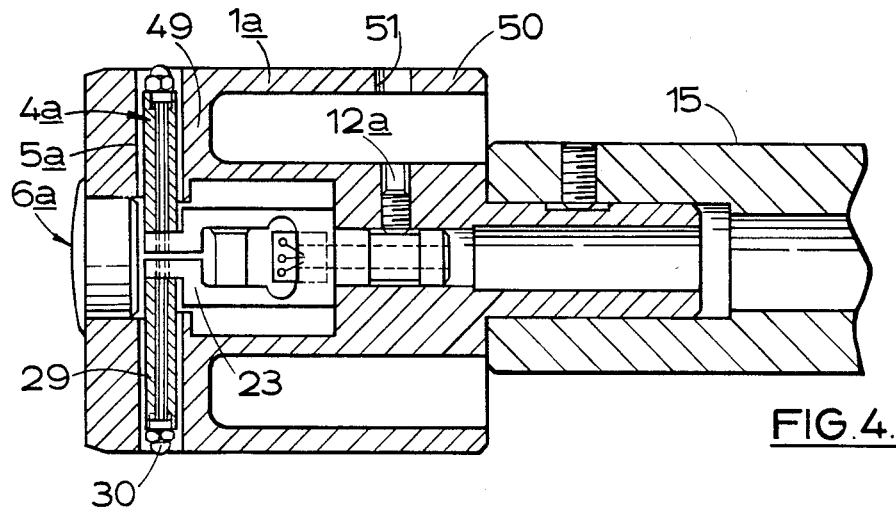
FIG. 4 is a side view, partly in cross-section, of a modification of the bore gauge shown in FIGS. 1 and 2.
Figure 5:
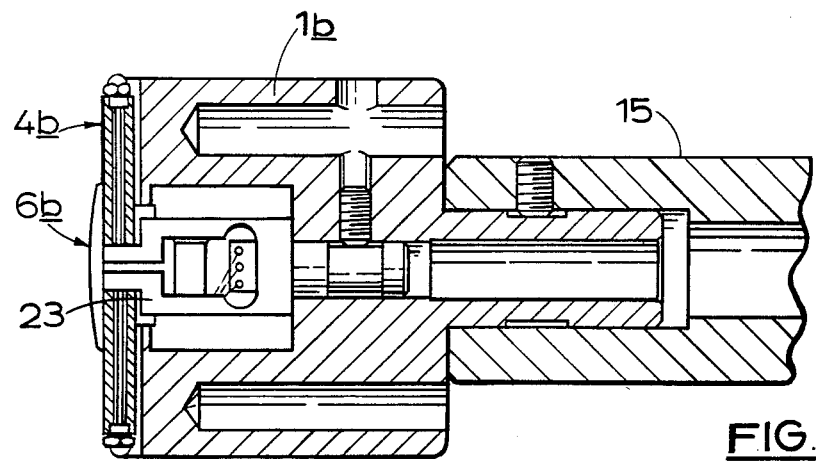
FIG. 5 is a side view, partly in cross-section, of a further modification of the bore gauge shown in FIGS. 1 and 2.

FIGS. 4 and 5 show modified shrouds for particular applications of the bore gauge. FIG. 4 shows a shroud 1a connected to the handle 15 as before but adapted to house elongated gauging contacts 4a comprising spacers 29 and tungsten carbide sensing tips 30 as described above. The gauging contacts 4a are slidably supported along their lengths in transverse radial bores 5a of the shroud 1a, and the transverse bores 5a are drilled in a radially extending end wall 49 of the shroud 1a, from which extends rearwardly and axially with the shroud 1a a cylindrical flange 50 provided with a hole 51 for adjustment of the grub screw 12a which retains the transducer in the shroud 1a. The open end of the shroud 1a is closed by an end cap 6a.

FIG. 5 shows a shroud 1b connected to the handle 15 as before and housing elongated gauging contacts 4 as shown in FIG. 4, but adapted for use in a shallow blind bore. The gauging contacts 4b are exposed outside the open end of the shroud 1b, although a slotted plastics end cap 6b is push-fitted in the open end to afford some protection to the fork 23.

Figure 6:
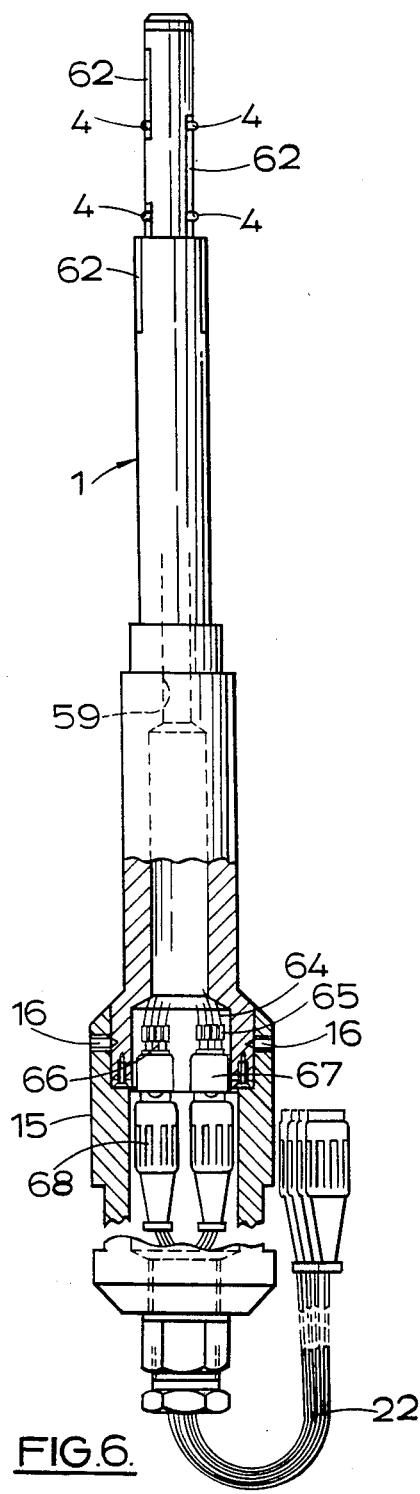
FIG. 6 is a side view, partly in cross-section, of a second bore gauge according to the invention.
Figure 7:
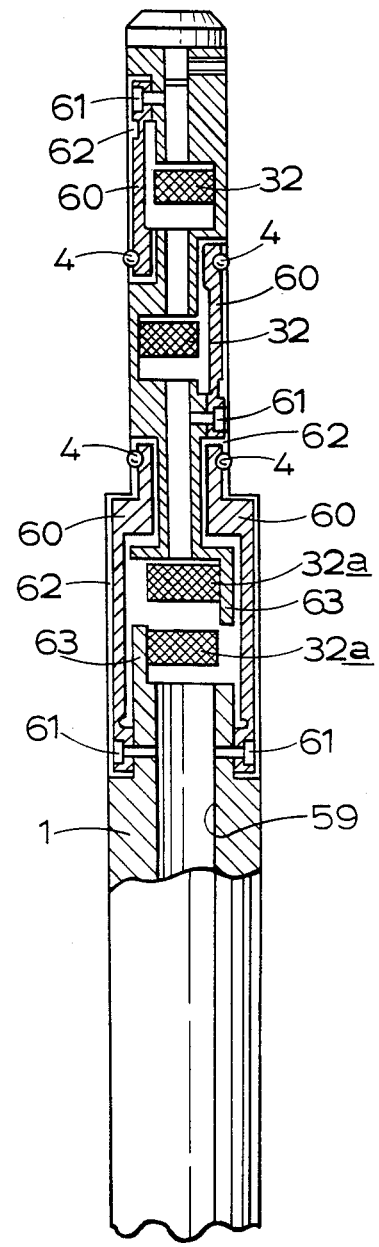
FIG. 7 is a view on an enlarged scale of part of the bore gauge shown in FIG. 6.

FIGS. 6 and 7 show an altogether different embodiment of the invention, although it shares with the previously described embodiments a shroud 1 attached to a handle 15, in this case by means of two grub screws 16. In this construction four coils and four cores assemblies (only the coil housings being shown at 32,32a for clarity) are used to effect measurement of the bore in two axially spaced planes. No fork structure is present, each of four gauging contacts 4 being brazed onto flexible spring metal limbs 60 which are attached to the shroud 1 by means of screws 61, and lie in slots in the surface of the shroud 1. The spring metal limbs 60 are cut away at their inner faces close to the point at which they are anchored by screws 61 to enhance their flexibility. The cores (not shown) are mounted for movement within their respective coils (not shown) on spindles (not shown) which are attached to inwardly facing faces of the flexible limbs 60, the coils (not shown) being rigidly fixed within their respective housings 32, 32a to the shroud 1, coil housings 32 being fixed to the internal walls of the shroud, and housings 32a being fixed to internal tabs 63 of the shroud 1. An axial bore 59 of the shroud serves to carry fine leads 64 for the electrical signals from the transducers, the leads terminating in connectors 65 which push-fit or are soldered onto tags 66 of multi-pin plugs 67 rigidly mounted in the handle 15 which mate with corresponding trailing sockets 68 provided on the external connecting leads 22. The open end of the bore is closed by an end cap 6. This arrangement permits a separate signal to be obtained from each gauging contact 4, which signals can be processed in any required manner, but particularly enables differential gauging between the two axially spaced planes, useful in determining whether or not the bore is tapered.

Figure 8:
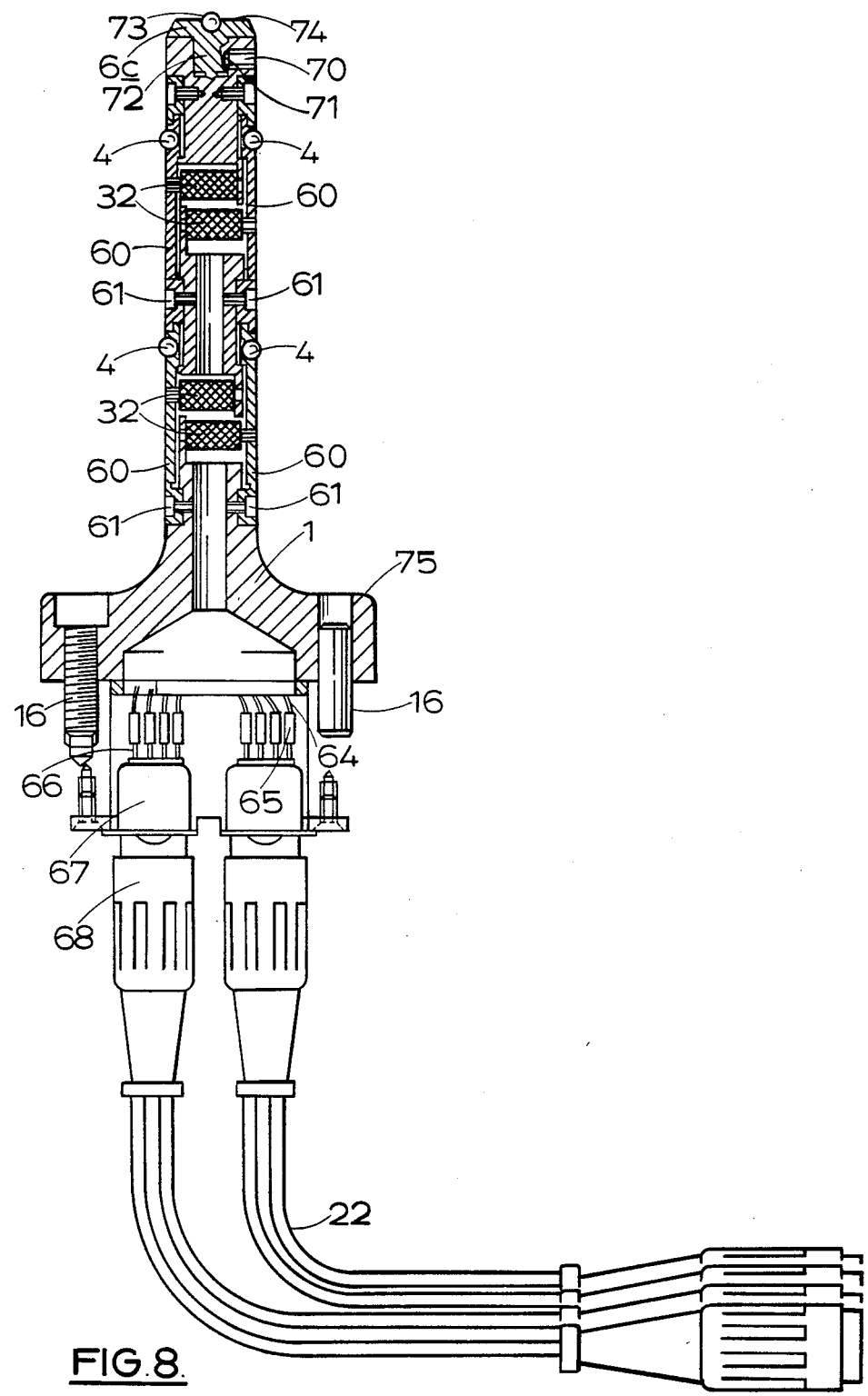
FIG. 8 is a side view, partly in cross-section, of a third bore gauge according to the invention.

FIG. 8 shows a similar arrangement to that of FIG. 7, but also shows the attachment of the spindles of the cores to the flexible limbs 60, and the housing is not shown but the screws 16 by which it is connected to the shroud 1 are shown. In this version, all the coil housings 32 are mounted on internal tabs of the shroud 1 and a plug-like end cap 6c of turned case-hardened steel is fixed in a blind bore 69 in the end of the shroud 1 by means of a grub screw 70. A shoulder 71 of the end cap 6c is engaged by the grub screw 70 and is inclined such that when the grub screw 70 is tightened, the end cap 6c is drawn into the bore 69. The shoulder 71 is provided on an axially rearwardly extending portion 72 of the end cap 65. The end cap 6c is provided with a small cylindrical tip piece 73 of thick wire or fine gauge bar of tungsten carbide, mounted transversely on an end face 74 of the end cap 6c (and viewed from its end in FIG. 8) and retained by adhesive.

In use, the shroud 1 of FIG. 8 incorporating the transducers as shown is attached to a handle (not shown) from which also projects parallel to the shroud 1 a plain piece of bar of appropriate cross section and stepped to provide an end stop corresponding to a shoulder 75 of the shroud 1. The bar and the shroud 1 can then be inserted into nominally parallel bores and the accuracy of the parallel bores can be checked by appropriate processing of the signals obtained from the transducers within the shroud 1. The tip piece 73 serves as a wearing tip in contacting either the end of the bore or whatever else it may encounter in use. A particular application for a gauge of this type is the checking of the parallel disposition of tappet bores and camshaft bores in some types of internal combustion engine.

I claim:

1. A bore gauge comprising an electrical transducer, a protective shroud and a handle, said transducer comprising a one-piece resilient fork-like structure formed from a single solid piece of spring steel plate by a machining operation without deformation and comprising two flexible limbs and a plug-shaped tail portion of transverse dimension not greater than the lateral span across said limbs, two gauging contacts, one of said gauging contacts being carried on each of said limbs, and a multi-turn coil and core, said core being mounted for movement within said coil, and said coil and said core each being movable with one of said gauging contacts, said shroud having a cylindrical outer portion adapted for insertion into the bore to be gauged and having a hollow interior, said hollow interior having a forward part, and a rear part comprising an axial bore detachably receiving and locating said tail portion of said transducer so that said transducer lies wholly within said hollow interior with said flexible limbs occupying the forward part thereof and said gauging contacts protruding laterally beyond said outer portion of said shroud for engagement with a wall of the bore to be gauged, and said shroud having a rearwardly extending plug portion to the rear of said outer portion and said bore, and a releasable fastening between said plug portion and said handle.

2. The bore gauge as claimed in claim 1, wherein said plug shaped tail portion and said bore are cylindrical.

3. A bore gauge as claimed in claim 1 wherein said core is directly attached to one limb of said fork, and said coil is directly attached to the other of said limbs of said fork.

4. A bore gauge as claimed in claim 3 wherein said transducer is adapted for partial insertion into said axial bore whereby said transducer is accurately and diametrically centred with respect to said shroud.

5. A bore gauge as claimed in claim 1 wherein a packing material is disposed around said coil and said core of each of said transducers, said packing material being sufficiently flexible to permit required relative movement of said coil and said core whilst being sufficiently robust to protect said coil and said core from mechanical shock.

6. A bore gauge as claimed in claim 1 wherein said gauging contact comprises sensing tips of a hard material directly attached to said transducer.

7. A bore gauge as claimed in claim 1 wherein said gauging contact comprises a sensing tip and a spacer, said sensing tip being detachably mounted on said spacer for detachable mounting on one of said limbs.

8. A bore gauge as claimed in claim 1 wherein said shroud is provided with at least one aperture in its outer surface through which said gauging contact protrudes.

9. A bore gauge as claimed in claim 1 wherein said shroud is provided with at least one slot in which said gauging contact is mounted and from which said gauging contact protrudes from said shroud.

10. A bore gauge comprising an electrical transducer, a protective shroud and a handle, said transducer comprising a one-piece resilient fork-like casting having two flexible limbs and a plug-shaped tail portion of transverse dimension not greater than the lateral span across said limbs, two gauging contacts, one of said gauging contacts being carried on each of said limbs, and a multi-turn coil and core, said core being mounted for movement within said coil, and said coil and said core each being movable with one of said gauging contacts, said shroud having a cylindrical outer portion adapted for insertion into the bore to be gauged and having a hollow interior, said hollow interior having a forward part, and a rear part comprising an axial bore detachably receiving and locating said tail portion of said transducer so that said transducer lies wholly within said hollow interior with said flexible limbs occupying the forward part thereof and said gauging contacts protruding laterally beyond said outer portion of said shroud for engagement with a wall of the bore to be gauged, and said shroud having a rearwardly extending plug portion to the rear of said outer portion and said bore, and a releasable fastening between said plug portion and said handle.

11. The bore gauge as claimed in claim 10, wherein said plug shaped tail portion and said bore are cylindrical.

* * * * *